Jan. 25, 1938.  G. A. LEITCH  2,106,641

MOWING MACHINE

Filed March 8, 1937  3 Sheets-Sheet 1

INVENTOR
GEORGE ALEXANDER LEITCH
BY
ATTORNEY

Jan. 25, 1938.  G. A. LEITCH  2,106,641
MOWING MACHINE
Filed March 8, 1937  3 Sheets-Sheet 2
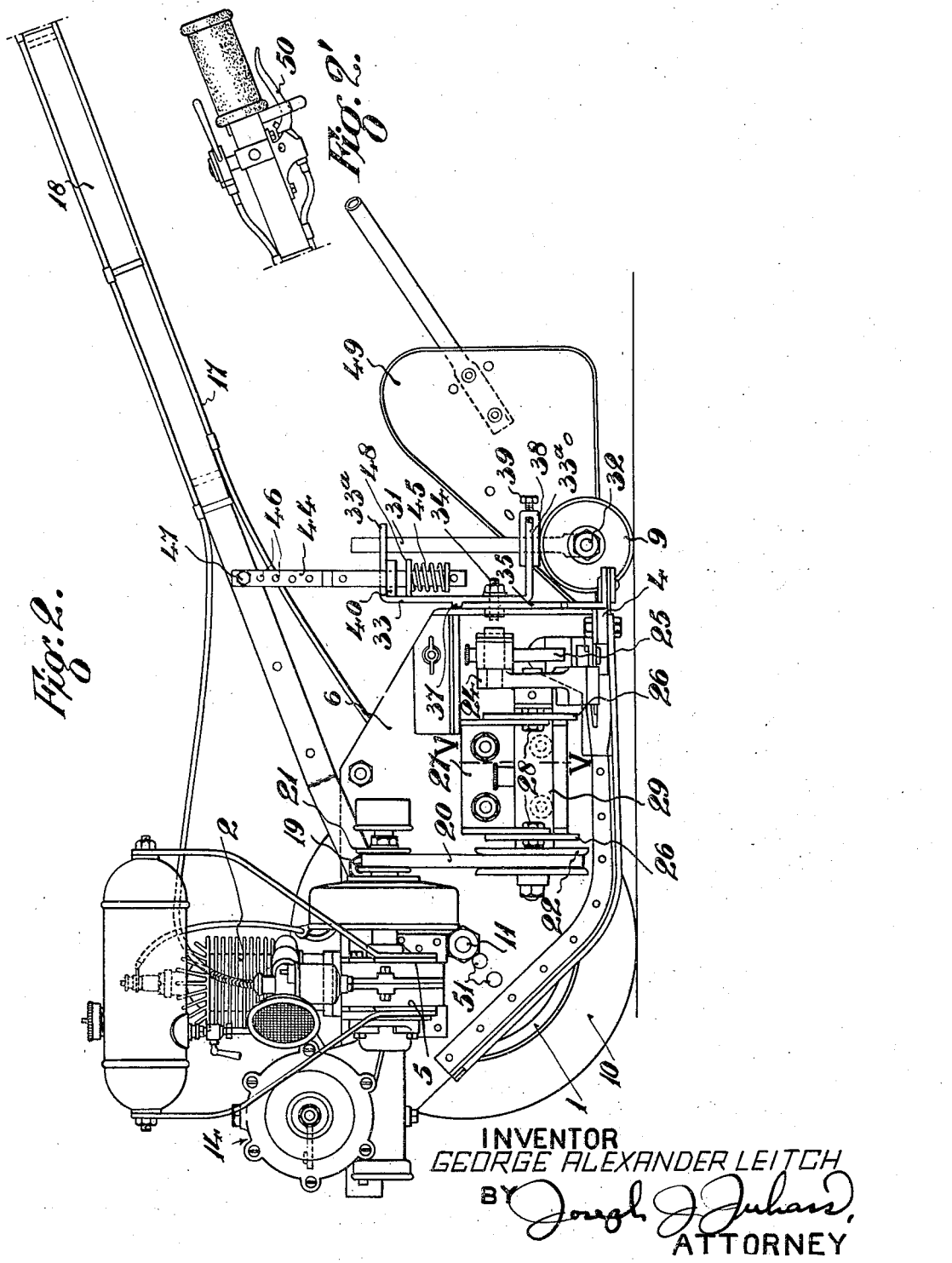
INVENTOR
GEORGE ALEXANDER LEITCH
BY
ATTORNEY Jan. 25, 1938.  G. A. LEITCH  2,106,641
MOWING MACHINE
Filed March 8, 1937    3 Sheets-Sheet 3
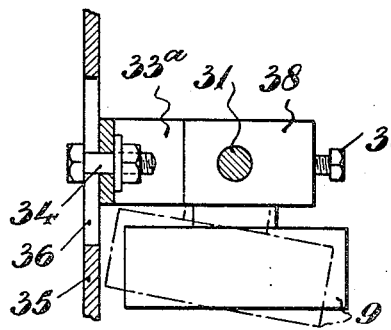
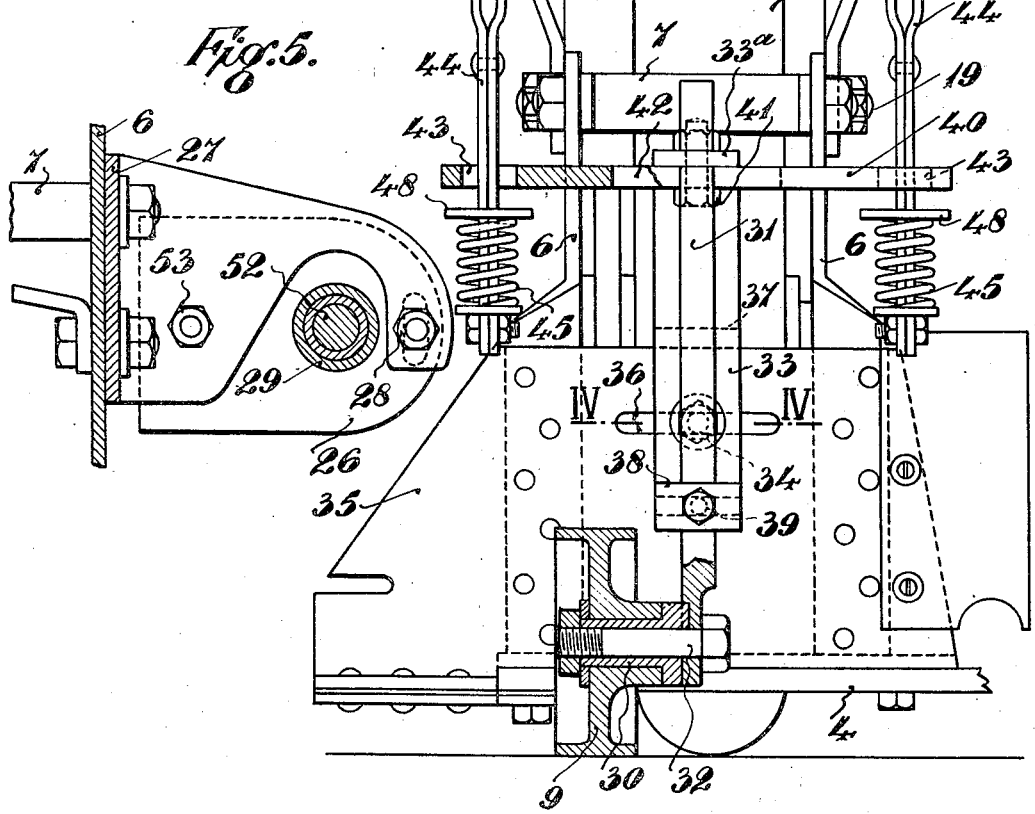
INVENTOR
GEORGE ALEXANDER LEITCH
BY
ATTORNEY Patented Jan. 25, 1938

2,106,641

UNITED STATES PATENT OFFICE 2,106,641

MOWING MACHINE

George Alexander Leitch, Birmingham, England, assignor to Charles H. Pugh Limited, Birmingham, England, a company of Great Britain Application March 8, 1937, Serial No. 129,675
In Great Britain August 24, 1936

16 Claims. (Cl. 56—25)

This invention relates to mowing, grass-cutting and like machines, of that kind having a movable cutter or knife-bar driven by an engine or power unit mounted upon a frame or part supported by a ground wheel which enables the machine to be moved over the ground. The invention, however, has more particular reference to power driven mowing or grass cutting machines of the reciprocating knife-bar type, with the engine on the one side of the ground wheel and the knife-bar upon the other side of the latter.

The object of the invention is to provide a mowing, grass-cutting, or like machine, of the kind referred to, which is of an improved and efficient construction; wherein the weight of the engine, and the torque created by the latter, is taken off the handles of the machine; and whereby the knife-bar or cutter may be readily adjusted according to requirements.

According to the invention, a mowing or grass-cutting machine is provided with a reciprocating cutter or knife-bar driven by an engine or power unit which is mounted upon a frame or part supported by two wheels, namely by a main or front ground wheel and by a smaller or second ground wheel disposed behind the said main or front ground wheel.

Also, according to the invention, a mowing or grass-cutting machine is provided with a movable cutter or knife-bar driven by an engine or power unit mounted upon a frame or part which is supported by a ground wheel, with the cutter or knife-bar and the engine or power unit disposed on opposite sides of the latter, the said frame or engine-carrying part being also supported by a second ground wheel disposed behind the first ground wheel.

The rear ground wheel of the machine is preferably disposed a little to the one side of the plane of the front wheel, preferably the engine side, so that it thus assists in taking part of the load of the engine, as well as the torque created by the latter, whilst the said rear wheel may be adjustable in height and may be arranged so that it may be set at different angles relatively to the plane of the front wheel. Lateral adjustment of the rear wheel may also be provided for. The engine may drive both the knife-bar and the front ground wheel and a clutch may be provided to enable the latter to be disconnected from the engine when required. The frame of the machine may be adjustable in height, such as by arranging the front wheel axle to pass through different holes in the sides of the frame, and in this way the cutters or knife-bar may be adjusted to the most suitable position, or most suitable angle, according to the type of work for which they are to be employed.

Figure 1 of the accompanying drawings represents a plan view of a mowing or grass-cutting machine provided with a rear wheel in accordance with this invention.

Figure 2 is a side view of the same.

Figure 2' is a detail of the controls on the handle.

Figure 3 is an end view of the rear portion of the machine upon a larger scale, with the rear wheel and handles in section, showing more clearly the adjustment provided for the rear wheel.

Figure 4 represents a horizontal section on the line $x$—$x$, Figure 3, showing by dotted lines how the rear wheel may be adjusted angularly.

Figure 5 represents a section on the line $x^1$—$x^1$, Figure 2, showing the provision for belt adjustment.

Figure 1:
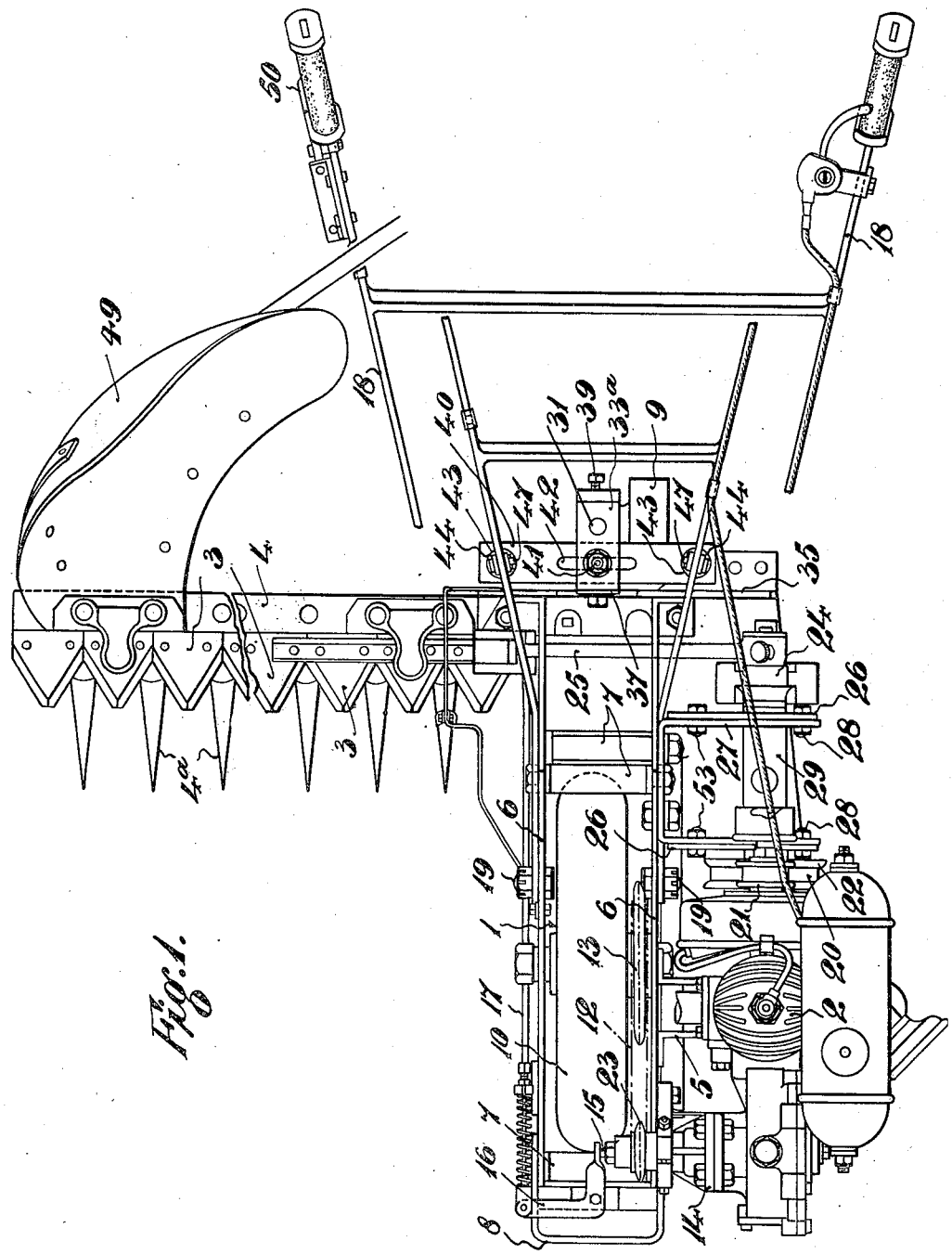

Referring to the drawings, the improved mowing or grass-cutting machine is power driven and is provided with a main front ground wheel 1 which supports a frame carrying an internal combustion engine 2 by which the wheel 1 may be driven, the said engine 2 being also arranged to operate a reciprocating knife-bar 3 which moves relatively to a stationary part 4 carrying a series of forwardly-projecting prong portions 4ª. The said knife-bar 3, which is made up of a plurality of cutting blades arranged as shown, is disposed upon the one side of the machine frame rearwardly of the ground wheel 1, the engine 2 being disposed upon the opposite side of the machine frame and being supported by a suitable bracket 5. The said frame of the machine comprises a pair of vertical side plates 6 disposed parallel to one another at a suitable distance apart and secured together by any suitable means, such as by transverse bracing members 7 and 8, whilst supporting the rear portion of the frame, and disposed behind and to one side of the main or front ground wheel 1, is an auxiliary smaller ground wheel 9. The said front ground wheel 1, which is fitted with a solid or pneumatic tyre 10, is mounted on ball or anti-friction bearings and is supported upon an axle 11 (Figure 2) passing through holes in the sides 6 of the frame, the said wheel 1 being driven from the engine 2 through the medium of a chain 12 engaging a sprocket wheel 13, fixed to the one side of the wheel, and passing around a smaller sprocket wheel 23, as shown in Figure 1, the said smaller sprocket wheel being actuated from the engine crankshaft through the medium of a transverse shaft and a dog or other clutch disposed within the housing 14. The said clutch is adapted to be operated by a rod 15 through the medium of a bell-crank lever 16 and Bowden wire 17, so that the engine may be disconnected from the ground wheel 1 when desired, whilst the machine is adapted to be guided over the ground by means of a pair of handles 18 disposed as shown and pivoted at their forward ends to the sides of the machine frame by bolts 19.

The reciprocating knife-bar 3 of the machine is intended to be operated continuously from the engine, and is driven from the rear end of the engine crankshaft by a belt 20 passing around a pulley 21 on the crankshaft and around a pulley 22 on a lower horizontal shaft 52 (Figure 5) supported within a bearing sleeve 29, the rear end of this shaft carrying a crank 24 connected to the knife-bar by a connecting rod 25. The bearing sleeve 29 is supported by plates 26 pivoted at 53 (Figure 5) to the sides of a U-bracket 27 on the one side of the machine frame so that the height of the shaft may be adjusted to vary the tension of the belt 20, the plates 26 being secured in their adjusted positions by nuts 28, as shown.

The rear ground wheel 9 of the machine is rotatably mounted upon a horizontal bearing sleeve 30, secured, as shown in Figure 3 of the drawings, to the lower end of a vertical rod 31 by means of a bolt 32. This rod 31 is carried by a U-shaped bracket member 33 disposed in a vertical plane and secured by a bolt 34 to a transverse vertical plate 35 fixed to the flanged rear ends of the side members 6 of the machine frame, the bolt 34 passing through a horizontal slot 36 in the said plate, so that by slackening the bolt the bracket 33, with the rod 31 and rear wheel 9, may be adjusted in a lateral direction relatively to the plane of the front ground wheel 1, being locked in place, after adjustment, by the nut on the bolt 34. If desired, means may be provided to prevent any tendency for the bracket 33 to turn about the bolt, such as by the provision of a rib 37 on the forward face of the bracket engaging the top edge of the plate 35. The rod 31 which carries the rear wheel 9 passes through aligned holes in the top and bottom arms 33ᵃ of the bracket 33, the said rod also passing through holes in the sides of a U-shaped drawplate 38 embracing the lower bracket arm and fitted with a bolt 39 engaging the edge of the latter. By tightening this bolt the member 38 is drawn rearwards and clamps the rod 31 against the edge of the hole in the bracket arm, thus firmly securing the rod to the bracket, whereas when the bolt 39 is slackened the rod 31, with the rear wheel 9, may be adjusted in a vertical direction relatively to the bracket and machine frame. The rod 31 may also be turned about its axis and the wheel 9 set at different angles relatively to the plane of the front wheel 1, such as is indicated by dotted lines in Figure 4. Passing beneath the top arm 33ᵃ of the rear wheel bracket 33 is a horizontal cross-bar 40 attached to the bracket arm by a bolt 41 passing through a slot 42 in the said cross-bar. The ends of the latter are formed with large holes 43 through which depend hangers 44 attached to the respective handles 18 of the machine. These hangers carry coiled buffer springs 45 at their lower ends, the said springs being disposed below the bar 40 on the rear wheel bracket, as shown in Figure 3, whilst the upper ends of the hangers are forked, the forked portions being formed with a series of registering holes 46 adapted to receive a pin 47 passing through a hole in the respective handle. The hangers 44 may thus be adjusted relatively to the handles, as desired, and the arrangement is such that when the handles are in their normal positions for use, such as shown in Figure 2, the springs 45 lie out of engagement with the bar 40, so that the handles do not bear any of the weight of the machine, the only points of connection with the machine being at the bolts 19 about which the handles may turn freely to a limited extent. Should, however, circumstances arise which make it necessary to lift the rear wheel 9 from the ground, the handles 18 may be raised to bring the washers 48 supported by the buffer springs 45 into engagement with the bar 40, and by then moving the handles further upwards the rear wheel may be lifted to the extent desired.

A swath plate 49 may be provided at the outer end of the knife-bar 3, as shown, and means may be provided to enable the knife-bar to be readily removed. The machine may be fitted with a knife-bar and a fixed cutter part of any suitable length, according to requirements.

When the machine is in use the front wheel 1 is driven from the engine through the clutch, and when desired, such as when it is required to wheel the machine along a road, the engine may be disconnected through the Bowden wire control, a suitable lever 50 being provided on one of the handles of the machine for this purpose. The rear wheel 9 of the machine serves to support the rear part of the machine frame, and owing to the fact that it is set to the engine side of the plane of the front wheel 1, as illustrated in Figure 1, it serves to support part of the weight of the engine which is heavier than the knife-bar and its associated parts, and the provision of the two laterally spaced wheels thus enable a perfect balance to be obtained, so that all weight is taken off the handles, and no effort has to be exerted by the operator to maintain the machine in the correct position. At the same time, the torque created by the engine, when in use, is also taken by the rear wheel instead of by the handles of the machine, so that an engine of adequate power may be employed. Provision is made for adjusting the machine frame relatively to the front wheel 1 and for this purpose each side 6 of the frame is formed with a number of holes 51, the front wheel axle 11 being adapted to be engaged through any particular hole, thus enabling the frame to be raised to any desired extent. Three different positions are provided for in the machine shown, and this gives three different positions to the knife-bar. Thus, the arrangement may be such that the blades may be set horizontally or at an angle of five or ten degrees to the horizontal according to which hole the wheel axle is engaged with. Not only may the front portion of the frame be adjusted in height, but the height of the rear portion of the machine and consequently the height of the knife-bar may be varied by means of the rear wheel 9, namely, by slackening the screw bolt 39 and moving the rear wheel rod 31 relatively to the bracket arms to the extent desired. The knife-bar 3 may thus be set at the desired height and also at the desired angle, whilst by suitably adjusting the height the knife-bar may be used for cutting grass verges while the machine is wheeled along the road, this being of considerable value where the grass extends up to the curb. The rear wheel may also be set at a slight angle to the plane of the front wheel, as stated, thus counteracting the reaction caused by the pressure of the grass against the knife-bar. Without this adjustment there would be a tendency for the knife-bar to swing rearwardly and thus make the operation of the machine difficult. By setting the rear wheel at a slight angle the knife-bar tends to swing forwardly and thus overcome any reaction. Owing to the lateral adjustment of the rear wheel which is provided for, a perfect balance may be obtained with knife-bars of different lengths, the wheel being moved laterally to support more or less of the engine weight, according to the weight of the knife-bar and its associated parts.

Any other suitable means may be provided for adjusting the height of the front part of the frame of the machine relatively to the front wheel, and the wheel axle 11 may, for example, be adjustable within an arcuate slot in the sides of the frame. Also, other means may be provided, if desired, for adjusting the rear wheel either vertically or laterally; or angularly relatively to the plane of the front wheel. The hangers 44 on the handles may, instead of engaging holes in the bar 40, pass through any other suitable part or parts on the machine frame, so that the rear wheel may be lifted, if necessary, by raising the handles. The frame of the machine may obviously be modified in any suitable manner. If desired, a clutch may be provided between the engine and the knife-bar or cutter, so that the latter may be disconnected from the engine and rendered inoperative when required, such as when the machine is travelling along a road or over hilly ground. The rear wheel may be of any suitable size.

Having fully described my invention, what I desire to claim and secure by Letters Patent is:—

1. A mowing or grass-cutting machine comprising a frame supported during the cutting operation by two wheels, namely, by a main or front ground wheel and by a smaller second ground wheel disposed behind the said main or front ground wheel, a power unit mounted upon the frame, and a reciprocating cutter or knife-bar driven by the said power unit.

2. A mowing or grass-cutting machine comprising a frame supported during the cutting operation by a front ground wheel and also by a second ground wheel disposed behind the said front ground wheel, a power unit mounted upon the frame, and a movable cutter or knife-bar driven by the power unit, said power unit and cutter or knife-bar being disposed on opposite sides of the frame.

3. A mowing or grass-cutting machine comprising a frame supported during the cutting operation by a front ground wheel and also by a second ground wheel disposed behind the said front ground wheel, a power unit mounted upon one side of the frame, and a movable cutter or knife-bar mounted upon the other side of the frame and adapted to be driven by the power unit, the rear ground wheel being disposed to one side of the plane of the front ground wheel.

4. A mowing or grass-cutting machine comprising a frame supported during the cutting operation by a front ground wheel and also by a second ground wheel disposed behind the said front ground wheel, an engine mounted upon one side of the frame, and a movable cutter or knife-bar mounted upon the other side of the frame and adapted to be driven by the engine, the rear ground wheel being disposed upon the engine side of the plane of the front ground wheel.

5. A mowing or grass-cutting machine comprising a frame supported during the cutting operation by a front ground wheel and also by a second ground wheel disposed behind the said front ground wheel, adjusting means for said second ground wheel whereby the wheel is adjustable in height, a power unit mounted upon the frame, and a movable cutter or knife-bar adapted to be driven by the power unit, said power unit and the cutter or knife-bar being disposed on opposite sides of the frame.

6. A mowing or grass-cutting machine comprising a frame supported during the cutting operation by a front ground wheel and also by a second ground wheel disposed behind the said front ground wheel, adjusting means whereby the rear ground wheel may be set in a plane at a different angle to the plane of the front ground wheel, a power unit mounted on one side of the frame, and a reciprocating cutter or knife-bar mounted upon the other side of the frame and being adapted to be driven from the power unit.

7. A mowing or grass-cutting machine comprising a frame supported during the cutting operation by a front ground wheel and also by a second ground wheel disposed behind the said front ground wheel, means whereby the said rear ground wheel may be adjusted into different positions in a lateral direction, an engine mounted upon one side of the frame, and a movable cutter or knife-bar mounted upon the other side of the frame and adapted to be driven from the engine.

8. A mowing or grass-cutting machine comprising a frame supported during the cutting operation by a front ground wheel and also by a second ground wheel disposed behind the said front ground wheel, means whereby the frame of the machine may be adjusted in height relative to the axis of the front ground wheel, an engine mounted upon one side of the frame, and a reciprocating cutter or knife-bar mounted upon the other side of the frame and adapted to be driven from the engine.

9. A mowing or grass-cutting machine comprising a frame supported during the cutting operation by a front ground wheel and also by a second ground wheel disposed behind the front ground wheel, an engine mounted upon one side of the frame, and a reciprocating cutter or knife-bar mounted upon the other side of the frame, both the front ground wheel and the cutter or knife-bar being adapted to be driven from the engine.

10. A moving or grass-cutting machine comprising a frame supported during the cutting operation by a front ground wheel and also by a second ground wheel disposed behind the front ground wheel, an engine mounted upon one side of the frame, a reciprocating cutter or knife-bar mounted upon the other side of the frame, power transmission mechanism between the engine and the front ground wheel, a clutch included in said transmission mechanism whereby the ground wheel may be disconnected from the engine, and power transmission mechanism between the engine and the cutter or knife-bar.

11. A mowing or grass-cutting machine comprising a frame supported during the cutting operation by a front ground wheel and also by a second ground wheel disposed behind the front ground wheel, a power unit mounted upon one side of the frame, a reciprocating cutter or knife-bar mounted upon the other side of the frame and adapted to be driven from the power unit, handles pivoted to the frame, hangers depending from the handles and passing through a part on the frame, and buffer devices carried by the hangers, said buffer devices being normally out of contact with said frame part but being adapted, by raising the handles, to be brought into engagement therewith for the purpose of lifting the rear wheel from the ground.

12. A mowing or grass-cutting machine comprising a frame supported during the cutting operation by a front ground wheel and also by a rear ground wheel smaller than the front ground wheel, a power unit mounted upon the frame, a movable knife bar driven by the power unit, said power unit and knife bar being disposed on opposite sides of the frame, means for adjusting the height of the rear ground wheel, means for adjusting the rear ground wheel so that it lies in a plane at an angle to the plane of the front ground wheel, and means for adjusting the rear ground wheel laterally relatively to the front ground wheel.

13. A mowing or grass-cutting machine comprising a frame supported during the cutting operation by a front ground wheel and also by a rear ground wheel, a power unit mounted upon the frame, a movable knife bar driven by the power unit, said power unit and knife bar being disposed on opposite sides of the frame, a bracket on the machine frame, means for adjusting the bracket laterally, a vertical rod carrying the rear ground wheel and means for adjustably securing the rod to the bracket, so that it may be moved vertically relatively thereto, and so that it may be turned about its axis.

14. A mowing or grass-cutting machine comprising a frame supported during the cutting operation by a front ground wheel and also by a rear ground wheel, a power unit mounted upon the one side of the frame, a movable cutter or knife bar on the other side of the frame driven by the power unit, handles pivoted to the frame, hangers passing through a part on the frame, buffer devices on the hangers below the said frame part and connecting pins passing through holes in the handles and through a selected one of a number of vertically-spaced holes in the hangers.

15. A mowing or grass-cutting machine comprising a frame supported during the cutting operation by a front ground wheel and by a rear ground wheel smaller than the front ground wheel, a power unit mounted upon the one side of the frame, a movable knife-bar mounted on the other side of the frame, a driving shaft operated by the power unit, means for operatively connecting the rear end of the driving shaft to the knife bar, means for operatively connecting the opposite end of the driving shaft to the front ground wheel, a bracket on the machine frame, a rod carrying the rear ground wheel rotatable and vertically slidable through bearing holes in the bracket, and means for locking the said rod relatively to the bracket.

16. A mowing or grass-cutting machine comprising a frame supported during the cutting operation by a front ground wheel and by a rear ground wheel smaller than the front ground wheel, an engine mounted upon the one side of the frame, a reciprocating knife-bar mounted upon the other side of the frame, means for driving the front ground wheel from the engine, means for driving the reciprocating knife-bar from the engine, an axle for the front ground wheel and a plurality of holes in the frame to receive the said front ground wheel axle selectively to enable the height of the frame from the ground to be varied.

GEORGE ALEXANDER LEITCH.